United States Patent [19]

Holle et al.

[11] 3,926,660

[45] Dec. 16, 1975

[54] TITANIUM DIOXIDE PIGMENT COATED WITH LAYERS OF ALUMINUM OXIDE AND METAL PHOSPHATE

[75] Inventors: Bernd Holle; Gerhard Winter, both of Krefeld, Germany

[73] Assignee: Bayer Aktiengesellschaft, Leverkusen, Germany

[22] Filed: Oct. 24, 1973

[21] Appl. No.: 409,212

[30] Foreign Application Priority Data

Nov. 15, 1972 Germany............................ 2255826

[52] U.S. Cl.............................. 106/300; 106/308 B
[51] Int. Cl.².......................................... C09C 1/36
[58] Field of Search................. 106/300, 308 B, 309

[56] References Cited
UNITED STATES PATENTS

| | | | |
|---|---|---|---|
| 2,161,975 | 6/1939 | Petersen ............................. | 106/300 |
| 3,127,280 | 3/1964 | Whately............................. | 106/300 |
| 3,141,788 | 7/1964 | Whately............................. | 106/300 |
| 3,513,007 | 5/1970 | Lederer ............................. | 106/300 |

FOREIGN PATENTS OR APPLICATIONS

| | | | |
|---|---|---|---|
| 1,213,557 | 3/1966 | Germany ............................ | 106/300 |

*Primary Examiner*—Winston A. Douglas
*Assistant Examiner*—J. V. Howard
*Attorney, Agent, or Firm*—Burgess, Dinklage & Sprung

[57] ABSTRACT

In the production of a non-aftercalcined titanium dioxide pigment of high greying stability when used in resin compositions, wherein the pigment is suspended in an aqueous medium, aluminum oxide and a metal phosphate are precipitated onto said pigment from the aqueous medium, the pigment is separated from the medium, washed and dried, the improvement which comprises effecting the precipitation by including in the aqueous medium a basic aluminum salt selected from the group consisting of a nitrate, chloride or mixtures thereof, adding alkali thereby to precipitate aluminum oxide onto the pigment as a layer of aluminum oxide aquate, and adding to the solution a watersoluble phsophate and a soluble compound of a metal having a valence of at least two, the phosphate of said metal being colorless and water-insoluble, thereby to precipitate on said pigment a metal phosphate. The resulting pigment is especially suited for use in resin compositions used in making laminates.

7 Claims, No Drawings

TITANIUM DIOXIDE PIGMENT COATED WITH LAYERS OF ALUMINUM OXIDE AND METAL PHOSPHATE

This invention relates to titanium dioxide pigments of high greying resistance for use in resin compositions, which are obtained by an aftertreatment with basic aluminum nitrate or aluminum chloride solutions, followed by the application of colorless phosphates of divalent and/or higher-valent metal cations by precipitation.

Resin compositions, especially melamine-formaldehyde resins, urea-formaldehyde resins and phenol-formaldehyde resins, are widely used in industry. This applies in particular to the field of laminates, i.e., compressed multilayer materials in which the resin holds together individual layers of, for example, wood, paper, polymers or glass fibers and, in doing so, imparts strength and hardness to them. Laminates in this form can be processed into scratchproof table coverings, panels for furniture and panelling for instance. Since some of the resin compositions referred to above are soluble in water, they can be opacified relatively easily by working various pigments into them. It is possible in this way significantly to extend their range of application.

Titanium dioxide is a pigment which is eminently suitable for this purpose. However, it is known that titanium dioxide is photochemically active. In laminates based on phenolformaldehyde, melamine-formaldehyde or urea-formaldehyde which are pigmented with titanium dioxide, the effect of ultra-violet light results in a steadily increasing greying phenomenon which is attributable to a blue-grey discoloration of the titanium dioxide pigment incorporated. Accordingly, attempts have been made to reduce the photoactivity of rutile pigments by subjecting them to an aftertreatment. Unfortunately, it is only possible to obtain an effective reduction through expensive, complicated calcination of the aftertreated pigments. Attempts have also been made to produce pigments with adequate photostability in laminates by special aftertreatments which preclude the necessity for subsequent calcination.

Aftertreatments of titanium dioxide pigments with some basic transition-metal salts, for example titanyl sulfate (U.S. Pat. No. 2,214,132 and British Pat. No. 252,262), and also with special aluminum salts, are known. Thus, U.S. Pat. No. 2,357,101 describes the treatment of a calcined $TiO_2$-pigment with basic aluminum salts, for example with basic aluminum chloride. U.S. Pat. No. 2,297,523 describes the aftertreatment of $TiO_2$ with aluminum acetate which forms basic aluminum acetate in aqueous medium, followed by thermal hydrolysis. German Pat. Deutsche Offenlegungsschrift No. 2,046,739 and British Pat. No. 1,134,249 both describe aftertreatment processes using specially prepared basic aluminum salt solutions prepared from aluminum salts, for example aluminum trichloride or aluminum nitrate. Unfortunately, rutile pigments aftertreated by these processes do not have the same degree of photostability as aftertreated pigments that have been subjected to calcination in resin systems of the kind referred to above. In fact, when pigments of this kind are worked into paper under simulated practical conditions (large excess of water), the aluminum oxide aquate layer applied by precipitation undergoes partial ageing or syneresis, with the result that the papers compressed to form laminates no longer show adequate photostability.

The aftertreatment of $TiO_2$-pigments with special metal phosphates is also known. Thus, it is possible by treatment with zirconium phosphate (U.S. Pat. No. 3,141,788), titanium phosphate (U.S. Pat. No. 3,127,280) or aluminum phosphate (U.S. Pat. No. 2,668,776), to obtain $TiO_2$-pigments with improved technical and optical properties coupled with an improved resistance to chalking, although unfortunately pigments of this kind do not show adequate photostability in laminates. German Pat. No. 1,213,557 describes the aftertreatment of prestabilized $TiO_2$-pigments with aluminum phosphate. This aftertreatment gives pigments with improved stability in melamine-formaldehyde and urea-formaldehyde resins, but unfortunately these pigments do not reach the level of photostability that can be obtained by subsequent calcination (temperature ≧ 200°C) of specially aftertreated $TiO_2$-pigments.

U.S. Pat. No. 3,552,995 describes an aftertreatment process in which a $TiO_2$-pigment from the chloride-combustion process is initially dry-coated with metal oxides by the action of metal halide gases and oxidizing gases, after which a second aftertreatment layer consisting of oxide hydrates and phosphates of metals is applied by a wet process.

U.S. Pat. No. 3,556,828 describes the aftertreatment of $TiO_2$-pigments with an alkali phosphate or phosphoric acid ester, optionally followed by the application through precipitation of oxide hydrates.

In British patent specification No. 1,256,421, an aftertreatment with oxide hydrates and/or phosphates is followed by another aftertreatment with a specially prepared and aged aluminum salt solution.

Finally, U.S. Pat. No. 3,513,007 describes an aftertreatment process in which oxide hydrates and/or phosphates of Si, Ti and Zr are initially applied by precipitation, followed by an aftertreatment with oxide hydrates of Al, Ce and/or Ca.

In all the processes just described, the aftertreatment leads to $TiO_2$-pigments with improved weather stability, gloss retention and covering power, although unfortunately these pigments generatlly do not satisfy requirements in regard to photostability in laminates.

The object of this invention is to produce pigments of high photostability in laminates which can readily be worked into resin molding compositions without any need for subsequent complicated and expensive calcination processes.

This object is realized in accordance with the present invention pursuant to which there is provided a non-aftercalcined titanium dioxide pigment of high greying stability when used in resin compositions, the titanium dioxide pigment carrying a layer of aluminum oxide aquate applied by precipitation and another precipitate thereon, also applied by precipitation, of a substantially water insoluble colorless phosphate of at least one metal carbon having a valence of at least two.

This pigment is produced by a modification of the basic process for the production of a non-aftercalcined titanium dioxide pigment wherein the pigment is suspended in an aqueous medium, aluminum oxide and a metal phosphate are precipitated onto said pigment from the aqueous medium, the pigment is separated from the medium, washed and dried. The novel improvement comprises effecting the precipitation by including in the aqueous medium a basic aluminum salt selected from the group consisting of a nitrate, chloride or mixtures thereof, adding alkali thereby to precipit aluminum oxide onto the pigment as a layer of aluminum oxide aquate, and adding to the solution a water-soluble phosphate and a soluble compound of a metal having a valence of at least two, the phosphate of said metal being colorless and water-insoluble, thereby to precipitate on said pigment said metal phosphate.

The aftertreatment in the process according to the invention uses basic aluminum nitrate and/or chloride salts containing a deficit of anions (excluding OH-anions) in relation to the aluminum cation. The word "basic" is not intended to imply an alkaline reaction of these salts, but merely to express the fact that, in purely stoichiometric terms, OH-anions predominate in these salts. Compounds with a ratio of aluminum cation to nitrate and/or chloride anion of about 0.5 to 5, (disregarding OH an anion) are suitable for the purposes of the invention. Examples of such compounds include $Al(OH)_{2.5}(NO_3)_{0.5}$ (cation : anion ratio 2), $Al(OH)_2NO_3$ (cation : anion ratio 1), $Al(OH)_{2.8}(NO_3)_{0.2}$ (cation : anion ratio 5), $Al_2(OH)_5Cl$ (cation : anion ratio 2). Basic salts of this kind can be produced by any of the methods normally used for the preparation of basic aluminum salt solutions (cf. Gmelins Handbuch der Anorg. Chemie, 8th Edition No. 35, Al part B, pp 117–125, 156 et seq, 205 et seq (1934), for example by dissolving aluminum metal in a deficit of nitric acid or hydrochloric acid or by peptizing $Al(OH)_3$ in a deficit of acid. Coating the pigment particles with a layer of aluminum oxide aquate is carried out by a gradual, steady increase in the pH-value of an aqueous pigment suspension, added to the basic aluminum salt solution, through the addition of alkali at ambient temperature, i.e., at a temperature of from about 10° to 40°C. In the present context, the term alkali is meant to include aqueous alkali hydroxide, ammonium hydroxide and alkali carbonate solutions.

It is of considerable importance to the process according to the invention that the hydroxides precipitated from basic aluminum salt solutions of this kind show different properties in regard to the $TiO_2$-pigment surface compared with the aluminum hydroxides precipitated from neutral aluminum salt solutions by the addition of alkali.

Further details regarding the deposit of an aluminum oxide aquate layer are set forth in application Ser. No. 326,204, filed Jan. 24, 1973, now pending, the disclosure of which is incorporated by reference.

Precipitation of the aluminum hydroxide from a basic aluminum salt solution is always preceded by polymerization reactions in the solution during which substantially linear aluminum hydroxo complexes are formed. As a result, precipitation of the aluminum hydroxide is displaced towards higher pH-values by comparison with the precipitation of aluminum hydroxide from neutral aluminum salt solution. The aluminum hydroxide precipitated from basic aluminum salt solutions has different physical properties (for example higher solubility product) and different chemical properties (for example high-polymeric, anion-modified crystal structure) from a hydroxide precipitated from neutral aluminum salt solutions. It has been found that the still soluble, linear aluminum hydroxide complexes initially formed when an alkaline precipitant is added to a basic aluminum salt solution in the presence of a $TiO_2$-pigment is able with advantage to interact with the $TiO_2$-surface so that, as more alkali is added, a homogeneous, firmly adering coating of aluminum hydroxide is formed on the pigment.

Furthermore, basic aluminum salt solutions such as these advantageously improve the state of dispersion of the $TiO_2$-pigment in the aqueous suspension and, above all, are able to maintain an optimum dispersion of the pigment into the vicinity of the neutral point (pH 7) which is of paramount importance so far as uniform coating of the individual pigment particles with aluminum oxide aquate is concerned. The application by precipitation of phosphates of divalent and/or higher-valent metal cations which takes place after the application of aluminum oxide aquate by precipitation in accordance with the invention is normally carried out in the weakly acid to neutral pH-range (pH 4.5–7.5). The above-described treatment with basic aluminum salts improverished in anions enables the $TiO_2$-pigment particles to be eminently dispersed in aqueous medium in this pH-range and renders the pigment surface particularly receptive to the application of metal phosphates by precipitation, thus providing for a particularly uniform precipitation of metal phosphate on to the highly disperse $TiO_2$-pigment particles.

Examples of suitable phosphate sources for the phosphate-containing aqueous solution used in accordance with the invention include alkali and ammonium phosphates, phosphoric acid or optionally even mixtures of these compounds. Suitable divalent or higher-valent metal cations include cations which yield colorless metal phosphates which are substantially insoluble in aqueous medium, or mixtures thereof. Examples of cations such as these include $Mg^{2+}$, $Ca^{2+}$, $Ba^{2+}$, $Zn^{2+}$, $Cd^{2+}$, $Al^{3+}$, $Mn^{2+}$, $Ti^{4+}$, $Zr^{4+}$. $Al^{3+}$ is particularly suitable and $Mn^{2+}$ even more suitable for the purposes of the invention. Any water-soluble salts, for example, sulfates, chlorides, nitrates, acetates, formates etc., can be used as cation-containing salts of this kind for precipitation of the metal phosphates. It is preferred to use solutions of sulfates. The precipitated metal phosphates can be orthophosphates and/or metaphosphates and/or polyphosphates, depending on their solubility in water and stability and on the pH-range of the precipitation. Also, depending upon the stoichiometry of the precipitation reagents, basic (metal cation excess), neutral or acid (metal cation deficit) metal phosphates can be precipitated. Accordingly, the metal phosphates have the general composition (disregarding their hydration) $xMO_a \cdot b\ P_2O_5$ wherein M is a metal having a valence of 2, 3 or 4, $a =$ one-half the valence of M and $a/b = 3$. $x$ can assume values from about 0.3 to 10. The precipitated metal phosphates may optionally contain hydrogen, alkali and/or ammonium cations as well.

Although, in cases where the after treatment is terminated at the aluminum oxide aquate precipitation stage and the washed and dried pigments coated with aluminum oxide aquate tested for their photostability after incorporation into paper and pressing of the papers into laminate panels, it is possible to obtain pigments with improved photostability by comparison with aftertreatment with aluminum oxide aquate from solutions of neutral aluminum salts, the resulting pigments still do not approach products that have been calcined twice in terms of stability.

Accordingly, it is essential of photostability is to be further improved that the treatment with basic aluminum salts which results in the application of an aluminum oxide aquate layer by precipitation should be followed in accordance with the invention by a second aftertreatment with metal phosphates. In this way, $TiO_2$ pigments of outstanding greying stability in laminates are obtained following separation of the pigment from the aqueous medium, washing and drying at temperatures of up to 200°C without any need for the pigments to be subjected to a second calcination (temperature ≧ 200°C). In one advantageous embodiment, the process according to the invention comprises the following stages:

1. Preparing the basic aluminum salt solution;
2. making the pigment into a paste with the basic aluminum salt solution;
3. increasing the pH-value of the pigment suspension as uniformly as possible with alkali (spraying in or on, pump-recirculation, thorough stirring) to pH-values of from 6.0 to 7.0 over a period of 2 to 6 hours, and precipitating the layer of aluminum oxide aquate;
4. precipitating one or more metal phosphates by the simultaneous addition of solutions of one or more metal salts (for example metal chlorides and metal sulfates), an alkali or ammonium phosphate or of phosphoric acid and, optionally, alkali to the aqueous pigment suspension for a period of from 10 to 120 minutes during which its pH-value should not fall below 5.0;
5. increasing the pH-value of the pigment suspension as uniformly as possible over a period of 10 to 120 minutes to pH-values of from 7.0 to 8.0;
6. stirring the pigment suspension for another 30 to 120 minutes; and
7. washing out with cold water, drying and grinding the aftertreated pigment.

The drying operation in stage 7 can be carried out at relatively low temperatures, i.e., at temperatures of from 25° to 250°C and preferably at temperatures of from 120° to 200°C. The purified filter sludge can be dried in any way, for example in a drying cabinet, thin-layer evaporator, belt dryer, cylinder dryer or by spray-drying.

After the treatment, the titanium dioxide pigments produced by the process according to the invention contain from about 0.5 to 10% by weight, preferably about 2.0 to 5.0% by weight, of aluminum oxide in the form of an aluminum oxide aquate layer, and 0.01 to 5% by weight of $P_2O_5$, preferably 0.03 to 3% by weight of $P_2O_5$, in the form of one or more metal phosphates (based on $TiO_2$).

Especially desirable properties are imparted when the pigments contain about 0.03 to 3% by weight of $P_2O_5$ in the form of manganese (II) phosphate or about 0.4 to 3% by weight of $P_2O_5$ in the form of aluminum phosphate.

To modify the properties of the pigment, the after-treatment process according to the invention can be preceded or followed by other aftertreatment stages known per se (for example organic aftertreatments with amines, hydroxy - alkanes, and epoxides).

Any $TiO_2$ pigments produced either by the chloride process or by the sulfate process can be used for the process according to the invention. Particularly suitable pigments are the $TiO_2$ (rutile) pigments whose surfaces have already been modified with aluminum oxide, i.e. which have been produced by burning $TiCl_4$ in the presence of $AlCl_3$ or by calcining a $TiO_2$-hydrolysis sludge in the presence of $Al_2O_3$, although the invention is by no means limited to pigments of this type.

Laminates based on melamine-formaldehyde, urea-formaldehyde or phenol-formaldehyde, can advantageously contain the $TiO_2$ pigments treated in accordance with the invention in quantities of from 1 to 40% by weight (based on the resin system). To test laminate stability, laminates were produced by two methods with different $TiO_2$-rutile pigments. The procedures adopted were as follows:

METHOD 1

Working the $TiO_2$ pigments into paper:

100 parts by weight of pulp, consisting of 50% by weight of bleached sulfite pulp and 50% by weight of bleached leafwood sulfate pulp, were beaten with 2000 parts by weight of water in a high-speed stirrer. 2.0 parts by weight of a standard wet strengthener were added with stirring to this pulp suspension, followed by the addition of 38 parts by weight of the $TiO_2$ pigment and of another 2.0 parts by weight of a wet strengthener. The resulting mixture was diluted while stirring with approximately 40,800 parts by weight of water and a sheet of paper formed by extraction under suction on a sheet former.

The paper was impregnated with a 50% solution of a melamine formaldehyde resin in water, squeezed and dried in air (for about 12 hours). Pressing was carried out for 7 minutes at 140°C under a pressure of about 80 atms.

METHOD 2

Working the $TiO_2$ pigment into a resin system 100 g of a melamine-formaldehyde resin were made into a paste with 60 ml of distilled water at 60° to 70°C by means of a glass rod, and the resulting paste subsequently stirred with a glass stirrer while 50 ml of ethanol was added until the melamine resin had been completely dissolved. The resulting solution keeps for only one day.

12.5 g of ground $TiO_2$ pigment was weighed into a glass beaker, 100 g of the above resin solution added and the resulting product was stirred for 5 minutes with an intensive stirrer functioning on the stator-rotor principle (7500 to 8000 rpm).

After the dispersion had been transferred to a porcelain dish, 4 strips of filter paper (Whatman No. 3) were semi-immersed in it one after the other, the saturated half fixed to a paperclip, followed by immersion of the other half. In order to prevent the dispersion from dripping, both sides of the paper were stripped over the dish with a glass rod. The paperclips holding the impregnated strips were suspended from a wire frame and left to dry for 20 minutes at 100°C. After cooling, the paper strips were drawn through non-pigmented resin solution and stripped as before. Thereafter the specimens were tempered for 20 minutes in a drying cabinet preheated to 138°C. The four strips of each specimen were then placed one on top of the other, marked and then placed between two clean chromium-plated steel plates. The specimens were pressed for 13 minutes under a pressure of 105 kg/cm² in a hydraulic two-column laboratory hand press equipped with a heating and cooling system which had been preheated to 149°C. The heating was then switched off with the pressure intact and the water-cooling system brought into operation for 3 to 4 minutes for cooling to 40°C. After the temperature of 40°C had been reached, the press could be opened and the pair of plates with the specimens in between removed.

The pigmented laminate panels were then tested for brightness before exposure to light and for percentage greying after exposure.

To this end, the remission of the panels was initially determined on the lower half of the panels with an electrical remission photometer using a standard green filter (Ry-filter). The remission value Ry determined is a measure of brightness. The upper half of the panels was then masked with an aluminum foil in order subsequently to reveal the contrast between the exposed and unexposed surface. The masked side was placed on the edge of a rotating plate (3 rpm) and, after the specimens had been exposed for 4 hours to the light of 6 Ultra-Vitalux lamps (arranged in a circle at a distance of 10 cm from the rotating plate), the Ry-value was measured over the same area of the specimen as before exposure. The percentage greying is expressed as follows:

$$\frac{(Ry \text{ before} - Ry \text{ after exposure}) \cdot 100}{Ry \text{ before exposure}}$$

Dimensionless greying factors $$\frac{\text{percentage greying of the test pigment}}{\text{percentage greying of the standard pigment}}$$

are obtained by simultaneously exposing a normal standard pigment.

Incorporation of the pigments into laminates as described above was carried out in each case after steam jet grinding (ratio by weight of grinding steam to product approximately 3 : 1).

The invention is illustrated by the following Examples:

EXAMPLE 1

2.4 kg of a $TiO_2$ pigment which had been produced by the sulfate process, calcined in the presence of $Al_2O_3$ (0.5% by weight, based on $TiO_2$) and subsequently ground in a Raymond mill were made into a paste at room temperature with 6.5 liters of water and 735 ml of a basic aluminum nitrate solution (80.5 g of $Al_2O_3$ per liter) of the composition $Al(OH)_{2.3}(NO)_{0.7}$. The basic aluminum nitrate solution had been prepared by dissolving aluminum shot in a deficit of $HNO_3$. The pigment suspension had a pH-value of 3.7. The aqueous pigment suspension was then adjusted to a pH-value of 4.8 by the addition of 197 ml of 1 N NaOH over a period of 45 minutes, and then to a pH-value of 6.7 by the addition of 373 ml of 1 N NaOH over a period of 3 hours.

The following solutions were then added together to the aqueous pigment suspension over a period of 30 minutes:

a. 169.5 g of $Na_2HPO_4 \cdot 12H_2O$ in 500 ml of $H_2O$
b. 240 ml of $Al_2(SO_4)_3$-solution (100 g of $Al_2O_3$ per liter)
c. 40 ml of 50% NaOH.

The pH-value of the pigment suspension, which now amounted to 5.3, was increased over a period of 90 minutes to pH 7.5 (262 ml of 1 N NaOH).

The aqueous pigment suspension was then stirred for 60 minutes at room temperature, filtered, washed with cold $H_2O$ and dried for 6 hours at 150°C. The dried pigment contained 3.0% by weight of $Al_2O_3$ and 2.4% by weight of $AlPO_4$ (based on $TiO_2$). The steam-jet-ground pigment worked into a laminate as described above (by method 1 — incorporating the pigment into paper) showed a percentage greying of 1.0% after exposure to light (greying factor 0.6). A greying factor of 0.6 was also found in the pigment worked into the resin system by method 2.

In a comparison test, the aftertreatment described above was terminated before the precipitation of $AlPO_4$ at pH 6.7. The pH-value was then adjusted to 7.5 with 1N NaOH over a period of 30 minutes, and the pigment worked up as described above. After drying and grinding, it contained 3.0% by weight of $Al_2O_3$ (based on $TiO_2$). After the laminate obtained by method 1 (incorporating the pigment into paper) had been exposed to light, it showed a percentage greying of 2.5% (greying factor 1.4), whereas a greying factor of 1.2 was measured in the laminate obtained by method 2 (incorporating the pigment into the resin system).

In another comparison test, the pigment described above was made into a paste with water only and subsequently aftertreated with $AlPO_4$ in the same way as described above. The pigment worked up as described above contained 2.4% by weight of $AlPO_4$ (in addition to 0.5% by weight of $Al_2O_3$ as calcining additive). The laminate obtained by method 1 showed a percentage greying of 2.4% (greying factor 1.3). Incorporation of the pigment into the resin system by method 2 also produced a greying factor of 1.3.

EXAMPLE 2

A solution of a basic aluminum chloride of the composition $Al(OH)_2Cl$ (97 g of $Al_2O_3$ per liter) was prepared by reacting Al-shot with a calculated quantity of HCl.

2.4 kg of the pigment described in Example 1 were made into an aqueous pigment suspension with 6.5 liters of $H_2O$ and 620 ml of the basic aluminum chloride solution, the pH-value of the resulting pigment suspension subsequently amounting to 4.8. The pigment suspension was then adjusted to a pH-value of 6.4 with 400 ml of 1N NaOH added over a period of 4 hours.

The following solutions were then added to the aqueous pigment suspension over a period of 30 minutes:

a. 169.5 g of $Na_2HPO_4 \cdot 12H_2O$ in 500 ml of $H_2O$
b. 157 g of $Al_2(SO_4)_3 \cdot 18H_2O$ in 250 ml of $H_2O$
c. 29 g of NaOH-pellets in 100 ml of $H_2O$.

The pH-value of the pigment suspension, which now amounted to 5.4, was increased to 7.5 by the addition of 270 ml of 1 N NaOH over a period of 60 minutes.

The aqueous pigment suspension was stirred for another 60 minutes at room temperature and then worked up as described in Example 1.

The dried pigment contained 3.0% by weight of $Al_2O_3$ and 2.4% by weight of $AlPO_4$ (based on $TiO_2$). The steam-jet-ground pigment worked into a laminate showed a percentage greying of 1.8% (working the pigment into paper) after exposure (greying factor 1.0). The pigment worked into the resin system produced a greying factor of 0.6.

In a comparison example, the aftertreatment described above was again terminated before the precipitation of $AlPO_4$ at pH 6.4. The pH-value was then adjusted to 7.5 by the addition of 1N NaOH over a period of 30 minutes and the pigment isolated, washed, dried and ground. It contained 3.0% by weight of $Al_2O_3$ (based on $TiO_2$). A percentage greying of 3.9 (incorporating the pigment into paper) was obtained after exposure of the laminate, corresponding to a greying factor of 2.2. The greying factor of the pigment in the resin system amounted to 1.8.

It can be seen from Examples 1 and 2 that the greying factors obtained after incorporation of the $TiO_2$ pigments into laminates by different methods are consistent with one another in order of magnitude. The subsequent precipitation of aluminum phosphate produces a considerable reduction in percentage greying by comparison with the precipitation of aluminum oxide aquate alone from solutions of basic aluminum salts. The precipitation of aluminum phosphate alone again leads to higher percentage greying.

The invention is illustrated in the following Examples with reference to other metal phosphates precipitated in addition to aluminum oxide aquate:

EXAMPLE 3

Example 1 was repeated. However, at a pH-value of the aqueous pigment suspension of 6.7, no aluminum phosphate was precipitated, instead magnesium phosphate was precipitated by the simultaneous addition of the following solutions to the aqueous pigment suspension over a period of 30 minutes:

a. 133.9 g of $MgCl_2 \cdot 6H_2O$ in 300 ml of $H_2O$
b. 157.0 g of $Na_2HPO_4 \cdot 12H_2O$ in 500 ml of $H_2O$.

Thereafter the pH-value of the pigment suspension amounted to 6.95 and was adjusted to 7.5 by the addition of 115 ml of 1 N NaOH over a period of 50 minutes. The pigment suspension was stirred for 60 minutes at room temperature and then worked up as described in Example 1. The dried pigment contained 3.0% by weight of $Al_2O_3$ and 2.4% by weight of magnesium phosphate (expressed as $Mg_3(PO_4)_2$ and based on $TiO_2$). The steam-jet-ground pigment incorporated into a laminate by method 2 (working the pigment into the resin system) had a greying factor of 0.7 after exposure. The precipitation of magnesium phosphate alone on to the pigment in a comparison test produced a greying factor of 1.3.

EXAMPLE 4

Example 1 was repeated. However, at a pH-value of the aqueous pigment suspension of 6.7, zinc phosphate instead of aluminum phosphate was precipitated by the simultaneous addition of the following solutions to the aqueous pigment suspension over a period of 30 minutes:

a. 128.7 g of $ZnSO_4 \cdot 7H_2O$ in 250 ml of $H_2O$
b. 107.0 g of $Na_2HPO_4 \cdot 12H_2O$ in 250 ml of $H_2O$
c. 11.95 g of NaOH pellets in 100 ml of $H_2O$.

Thereafter the pH-value of the pigment suspension amounted to 5.6 and was adjusted to 7.5 by the addition of 266 ml of 1 N NaOH over a period of 75 minutes. The pigment suspension was then stirred for 60 minutes at room temperature and subsequently worked up as described in Example 1. The dried pigment contained 3.0% by weight of $Al_2O_3$ and 2.4% by weight of zinc phosphate (expressed as $Zn_3(PO_4)_2$ and based on $TiO_2$). The steam-jet-ground pigment worked into the resin system had a greying factor of 0.8 after exposure. The precipitation of zinc phosphate alone onto the pigment in a comparison test produced a greying factor of 1.4.

EXAMPLE 5

Example 1 was repeated. However, at a pH-value of the aqueous suspension of 6.7, zirconium phosphate instead of aluminum phosphate was precipitated by the simultaneous addition of the following solutions to the aqueous pigment suspension over a period of 30 minutes:

a. 85.2 g of $ZrOCl_2 \cdot 8H_2O$ in 250 ml of $H_2O$
b. 126.3 g of $Na_2HPO_4 \cdot 12H_2O$ in 500 ml of $H_2O$
c. 2.25 g of NaOH in 16 ml of $H_2O$.

Thereafter the pH-value of the pigment suspension amounted to 6.0 and was adjusted to 7.5 by the addition of 175 ml of 1 N NaOH over a period of 30 minutes. The pigment suspension was stirred for 60 minutes at room temperature and then worked up as described in Example 1. The dried pigment contained 3.0% by weight of $Al_2O_3$ and 2.4% by weight of zirconium phosphate (expressed as $Zr_3(PO_4)_4$ and based on $TiO_2$). The steam-jet-ground pigment worked into the resin system had a greying factor of 0.6 after exposure.

EXAMPLE 6

Example 1 was repeated. However, at a pH-value of the aqueous pigment suspension of 6.7, manganese (II) phosphate instead of aluminum phosphate was precipitated by the simultaneous addition of the following solutions to the aqueous pigment suspension over a period of 30 minutes:

a. 33.9 g of $MnSO_4 \cdot 4H_2O$ in 150 ml of $H_2O$
b. 36.3 g of $Na_2HPO_4 \cdot 12H_2O$ in 150 ml of $H_2O$
c. 15 ml of 1 N NaOH.

Thereafter the pH-value of the pigment suspension amounted to 7.0 and was adjusted to 7.5 by the addition of 113 ml of 1 N NaOH over a period of 50 minutes. The pigment suspension was then stirred for 60 minutes at room temperature and subsequently worked up as described in Example 1. The dried pigment contained 3.0% by weight of $Al_2O_3$ and 0.75% by weight of manganese (II) phosphate (expressed as $Mn_3(PO_4)_2$ and based on $TiO_2$). The steam-jet-ground pigment worked into a paper mass by method 1 had a percentage greying of 1.2% after exposure, corresponding to a greying factor of 0.5.

It will be appreciated that the instant specification and examples are set forth by way of illustration and not limitation, and that various modifications and changes may be made without departing from the spirit and scope of the present invention.

What is claimed is:

1. In the production of a non-aftercalcined titanium dioxide pigment of high greying stability when used in resin compositions, wherein the pigment is suspended in an aqueous medium, aluminum oxide and a metal phosphate are precipitated onto said pigment from the aqueous medium, the pigment is separated from the medium, washed and dried, the improvement which comprises effecting the precipitation by including in the aqueous medium a basic aluminum salt selected from the group consisting of a nitrate, chloride or mixtures thereof, adding alkali thereby to precipitate aluminum oxide onto the pigment as a layer of aluminum oxide aquate, and thereafter adding to the solution a water-soluble phosphate and a soluble compound of a metal having a valence of at least two, the phosphate of said metal being colorless and water insoluble, thereby to precipitate on said pigment a metal phosphate.

2. The process of claim 1 wherein the soluble compound of a metal having a valence of at least two is a salt, and precipitation of the metal phosphate is effected by addition of alkali continued until the solution is substantially neutralized.

3. The process of claim 1, wherein the titanium dioxide pigment is a rutile pigment from the chloride or sulfate process stabilized with $Al_2O_3$.

4. The process of claim 1, wherein the basic aluminum salt has a ratio of aluminum cation ($Al^{3+}$) to nitrate plus chloride anion of about 0.5 to 5.

5. The process of claim 1, wherein a compound of the approximate stoichiometric composition $Al(OH)_{2.5}(NO_3)_{0.5}$, is used as the basic aluminum salt.

6. The process of claim 1, wherein a compound of the approximate stoichiometric composition $Al(OH)_{2.5}Cl_{0.5}$ is used as the basic aluminum salt.

7. The process of claim 2, wherein the titanium dioxide pigment is a rutile pigment from the chloride or sulfate process stabilized with $Al_2O_3$, the basic aluminum salt has a ratio of aluminum cation ($Al^{3+}$) to nitrate plus chloride anion of about 1 to 3, the pH-value of the pigment suspension is adjusted to about 6 to 7 by the addition of alkali at ambient temperature over a period of 2 to 6 hours, the water-soluble phosphate is at least one member selected from the group consisting of a phosphoric acid, an alkali metal and ammonium phosphate, the metal is at least one member selected from the group consisting of magnesium, calcium, barium, zinc, cadmium, aluminum, manganese (II), titanium (IV) and zirconium (IV), the alkali is added over a period of 10 to 120 minutes during which the pH-value does not fall below 5, after which the pH of the pigment suspension is increased to about 7 to 8 over a period of about 10 to 120 minutes, and the aqueous pigment suspension is stirred for about 30 to 120 minutes.

* * * * *